United States Patent [19]

Asakura et al.

[11] Patent Number: 4,953,164
[45] Date of Patent: Aug. 28, 1990

[54] CACHE MEMORY SYSTEM HAVING ERROR CORRECTING CIRCUIT

[75] Inventors: Mikio Asakura; Kazuyasu Fujishima; Yoshio Matsuda, all of Hyogo, Japan

[73] Assignee: Mitsubishi Denki Kabushiki Kaisha, Tokyo, Japan

[21] Appl. No.: 254,233

[22] Filed: Oct. 6, 1988

[30] Foreign Application Priority Data

Nov. 12, 1987 [JP] Japan .................................. 62-287992

[51] Int. Cl.⁵ ............................................. G06F 11/10
[52] U.S. Cl. .................................. 371/40.1; 371/40.2
[58] Field of Search ...................... 371/13, 40.1, 40.2

[56] References Cited

U.S. PATENT DOCUMENTS

| | | | |
|---|---|---|---|
| 3,814,921 | 6/1974 | Nibby et al. | 371/40.2 |
| 4,077,028 | 2/1978 | Lui et al. | 371/40.1 |
| 4,493,081 | 1/1985 | Schmidt | 371/37.3 |
| 4,577,293 | 3/1986 | Matick et al. | 365/189 |
| 4,617,660 | 10/1986 | Sakamoto | 371/40.2 |
| 4,654,847 | 3/1987 | Dutton | 371/40.2 |
| 4,703,453 | 10/1987 | Shinoda et al. | 371/40.1 |
| 4,791,642 | 12/1988 | Taylor | 371/40.2 |

FOREIGN PATENT DOCUMENTS 59-2300 1/1984 Japan .

OTHER PUBLICATIONS

"A 70-ns Word-Wide 1-Mbit ROM with On-Chip Error-Correction Circuits", IEEE Journal of Solid-State Circuits by H. Davis, pp. 958-963.
"Error-Correcting Codes for Semiconductor Memory Applications: A State-of-the-Art Review", IBM J. Res. Develop. by Chen et al, pp. 124-134.
"Soft Error Analysis of Fully Static MOS RAM", Japanese Journal of Applied Physics, by Yoshimoto et al., pp. 69-73.
"Influences on Soft Error Rates in Static RAM's", IEEE Journal of Solid-State Circuits, by P. Carter et al., pp. 430-436.
"A Submicron 1 Mbit Dynamic RAM with a 4-Bit-at-a-Time Built-In ECC Circuit", IEEE Journal of Solid-State Circuits by J. Yamada et al., pp. 627-633.

Primary Examiner—Charles E. Atkinson
Attorney, Agent, or Firm—Lowe, Price, LeBlanc, Becker & Shur

[57] ABSTRACT

There are provided a first memory cell array and a second memory cell array. The first memory cell array comprises a dynamic RAM and the second memory cell array comprises a static RAM. In addition, the second memory cell array has smaller capacity than that of the first memory cell array. An error correcting circuit, a check bit generating circuit and a register are connected between the first memory cell array and the second memory cell array. Data which is frequently accessed is transferred from the first memory cell array to the second memory cell array and stored therein. Access is made to the second memory cell array. When data which is required is not in the second memory cell array, access is made to the first memory cell array. At the time of transferring data from the first memory cell array to the second memory cell array, errors are corrected by the error correcting circuit. The check bit generating circuit is responsive to data whose error is corrected by the error correcting circuit for generating new check bits.

12 Claims, 9 Drawing Sheets

|  | | INFORMATION BITS | | | | CHECK BITS |
|--|--|---|---|---|---|---|
|  | | 1 | 2 | 3 | 4 | |
| INFORMATION BITS | 1 | 1 | 0 | 0 | 1 | 0 |
|  | 2 | 0 | 1 | 0 | 0 | 1 |
|  | 3 | 0 | 1 | 1 | 0 | 0 |
|  | 4 | 1 | 1 | 1 | 0 | 1 |
| CHECK BITS | | 0 | 1 | 0 | 1 | |

FIG. 2B

|  | | INFORMATION BITS | | | | CHECK BITS |
|--|--|---|---|---|---|---|
|  | | 1 | 2 | 3 | 4 | |
| INFORMATION BITS | 1 | 1 | 0 | 0 | 1 | 0 |
|  | 2 | 0 | 1 | 0 | 0 | 1 |
|  | 3 | 0 | 1 | (0) | 0 | (0) |
|  | 4 | 1 | 1 | 1 | 0 | 1 |
| CHECK BITS | | 0 | 1 | (0) | 1 | |

CACHE MEMORY SYSTEM HAVING ERROR CORRECTING CIRCUIT

BACKGROUND OF THE INVENTION

1. Field of the Invention

The present invention relates generally to a semiconductor memory system, particularly to a cache memory system having error correcting means contained therein.

2. Description of the Prior Art

In recent years, capacity of a semiconductor memory device is increased. Correspondingly, there occurs some problems. For example, soft errors are caused. Soft errors means that information stored in a memory cell erroneously changes. One of the causes of soft errors is incidence of alpha articles, which is a main problem to be considered in a recent dynamic random access memory (referred to as dynamic RAM hereinafter). More particularly, soft errors are caused, for example, upon incidence of alpha particles generated by radioactive substances included in package materials or the like. The soft errors return to the normal state by re-writing. Thus, soft errors are not a permanent failure. The frequency of soft errors becomes high particularly in a high density dynamic random access memory (RAM). In order to solve the soft error problem, a semiconductor memory device having an error correcting circuit contained therein is proposed, which is disclosed in, for example, Japanese Patent Laying-Open Gazette No. 2300/1984.

Figure 1:
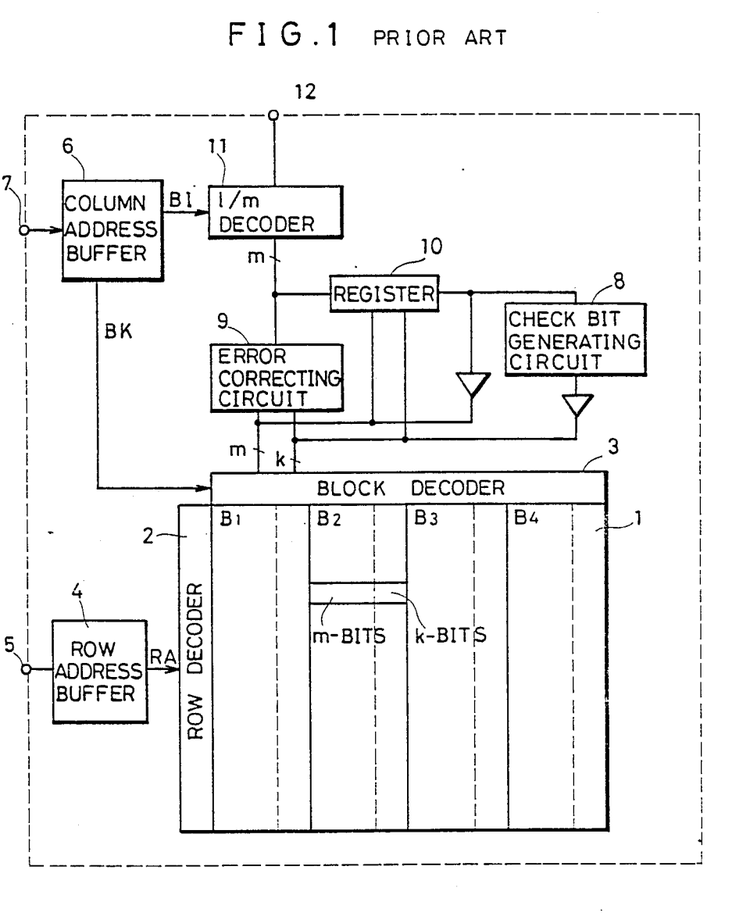
FIG. 1 is a block diagram showing structure of conventional semiconductor memory device having an error correcting circuit contained therein.

FIG. 1 is a block diagram showing structure of a conventional semiconductor memory device having an error correcting circuit contained therein.

Referring to FIG. 1, a memory cell array 1 comprises a plurality of memory cells arranged in a plurality of rows and columns. The memory cell array 1 is divided into a plurality of blocks, each of the blocks comprising memory cells arranged in a plurality of columns. The memory cell array 1 shown in FIG. 1 is divided into four blocks B1 to B4, each of the blocks B1 to B4 comprising memory cells arranged in (m+k) columns. (m+k)-bit data comprising information bits including m bits and check bits including k bits are stored as one word data in each row of each of the blocks in the memory cell array 1.

The memory cell array 1 is provided with a row decoder 2 responsive to a row address signal RA for selecting one row of the memory cell array 1 and a block decoder 3 responsive to a block selecting signal BK for selecting one block in the memory cell array 1. A row address buffer 4 suitably applies to the row decoder 2 the row address signal RA applied to a row address input terminal 5. A column address buffer 6 applies to the block decoder 3 a part of a column address signal CA applied to a column address input terminal 7 as a block selecting signal BK and applies to a 1/m decoder 11 as described below the remainder of the column address signal CA as a bit selecting signal BI.

Furthermore, a check bit generating circuit 8, an error correcting circuit 9 and a register 10 are connected to the memory cell array 1. The check bit generating circuit 8 generates check bits including k bits for detecting and correcting an error in both information bits including m bits and the check bits or an error in information bits. The error correcting circuit 9 is responsive to the check bits for detecting an error in both the information bits and the check bits or an error in the information bits and correcting the detected error. One word data is temporarily stored in the register 10. The 1/m decoder 11 is responsive to the bit selecting signal BI applied from the column address buffer 6 for selecting one bit of information bits including m bits and providing the same to a data input/output terminal 12 or for applying to any one bit in the register 10 one bit data to be applied to the data input/output terminal 12.

Description is now made of operation of the semiconductor memory device having an error correcting circuit contained therein.

At the time of reading out data, when one bit in the memory cell array 1 is accessed by the row address signal RA and the column address signal CA, one word data including the one bit is selected by the row decoder 2 and the block decoder 3 and transferred to the error correcting circuit 9. The error correcting circuit 9 is responsive to check bits including k bits included in the one word data for detecting the presence or absence of an error of information bits including m bits. If an error is detected, the error correcting circuit 9 corrects the error and transfers the same to the 1/m decoder 11. The 1/m decoder 11 is responsive to the bit selecting signal BI applied from the column address buffer 6 for selecting one bit of the information bits including m bits and providing the same to the data input/output terminal 12.

At the time of writing data, when one bit in the memory cell array 1 is accessed by the row address signal RA and the column address signal CA, one word data including the one bit is selected by the row decoder 2 and the block decoder 3 and transferred to the register 10. The 1/m decoder 11 is responsive to the bit selecting signal BI applied from the column address buffer 6 for transferring to any one bit in the register 10 one bit data to be applied to the data input/output terminal 12. Therefore, one bit of information bits of data stored in the register 10 is reloaded. The information bits including the reloaded bit is transferred to one row in a block selected by the row decoder 2 and the block decoder 3 and also transferred to the check bit generating circuit 8. The check bit generating circuit 8 is responsive to information bits including m bits for generating check bits including k bits. The check bits are transferred to the same row in the same block as that including the corresponding information bits.

In addition to the above described Gazette, a semiconductor memory device having an error correcting circuit contained therein is described in, for example, IEEE Journal of Solid-State Circuits, Vol. SC-19, Oct. 1984, pp. 627–633 and IEEE Journal of Solid-State Circuits, Vol. SC-20, Oct. 1985, pp. 958–963. In addition, an error correcting code is described in IBM J. RES. DEVELOP, Vol. 28, No. 2, Mar. 1984, pp. 124–134.

Description is now made of an example of the fundamental principle of a method for generating check bits and a method for correcting an error.

Figure 2A:
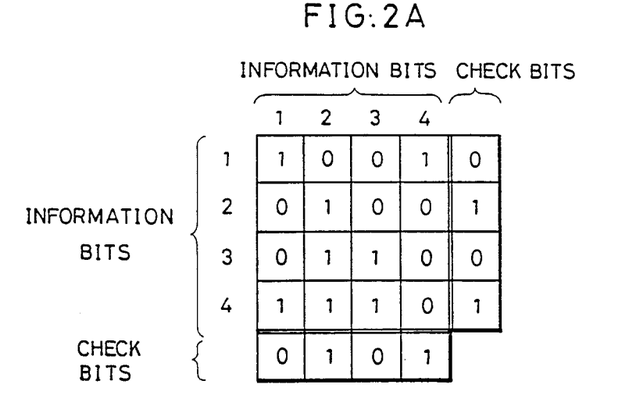

Referring to FIG. 2A, information bits including 16 bits are arranged in a 4 by 4 matrix. When the sum of a bits in one row is an even-number, "0" is arranged at the right of the row. When the sum of bits in one row is an odd-number, "1" is arranged at the right of the row. In addition, when the sum of bits in one column is an even-number, "0" is arranged under the column. When the sum of bits in one column is an odd-number, "1" is arranged under the column. Therefore, bits arranged at the right of and under the information bits in a matrix serve as check bits.

Figure 2B:
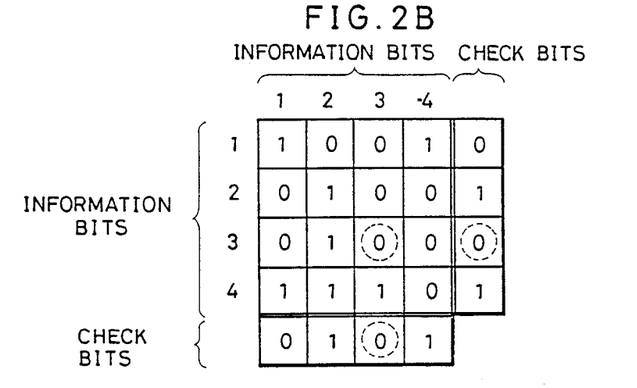

For example, as shown in FIG. 2B, it is assumed that a bit at an intersection of the third row and the third column changes from "1" to "0". In this case, since the sum of bits in the third row is an odd-number, the check bit must be "1" if there is no error in this row. However, since the check bit is "0", any bit in this row is erroneous. In addition, since the sum of bits in the third column is an odd-number, the check bit must be "1" if there is no error in the column. However, since the check bit is "0", any bit in the column is erroneous. As a result, it is determined that a bit at an intersection of the third row and the third column is erroneous. Thus, this bit is inverted from "0" to "1" so that the error is corrected.

In the above described conventional semiconductor memory device, since data is passed through the error correcting circuit 9 at the time of reading out data and the data is passed through the check bit generating circuit 8 at the time of writing data, the access time and the cycle time are increased. For example, when the error correcting circuit 9 is added to a dynamic RAM having an access time of 100 ns, the access time increases by approximately 20 ns.

SUMMARY OF THE INVENTION

An object of the present invention is to provide a semiconductor memory device with very fast access time and high reliability.

Another object of the present invention is to provide a high speed semiconductor memory device without losing soft error immunity.

Still another object of the present invention is to provide a dynamic RAM system having very fast access time and error correction capability.

A semiconductor memory device according to the present invention stores information bits including a plurality of bits and check bits for detecting and correcting an error in both the information bits and the check bits or an error in the information bits, which comprises check bit generating means responsive to the information bits for generating the check bits, first storing means for storing a plurality of pairs of information bits and check bits generated by the check bit generating means, error correcting means for detecting and correcting the error in both the information bits and the check bits or the error in the information bits using the corresponding check bits, first transferring means for transferring the information bits stored in the first storing means and the corresponding check bits to the error correcting means, second storing means to which access can be made at higher speed than the access speed to the first storing means and for storing some of the information bits, and second transferring means for transferring to the second storing means information bits whose any error is corrected by the error correcting means.

In the semiconductor memory device according to the present invention, since an information bit which is frequently accessed, of a plurality of pairs of information bits and check bits stored in the first storing means is stored in advance in the second storing means to which access can be made at higher speed than the access speed to the first storing means, a memory system is adapted to usually make access to the second storing means so that the average access time can be reduced. In addition, since an error is corrected by the error correcting means at the time of reading out data from the first storing means and soft error rate in the second storing means is inherently smaller than that in the first storing means, data with high reliability is stored in the second storing means.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are diagrams for explaining the principle of a method for generating check bits and a method for correcting an error, where FIG. 2A illustrates the case in which there is no error of information bits and FIG. 2B illustrates the case in which there is an error of information bits;

DESCRIPTION OF THE PREFERRED EMBODIMENTS

Figure 3:
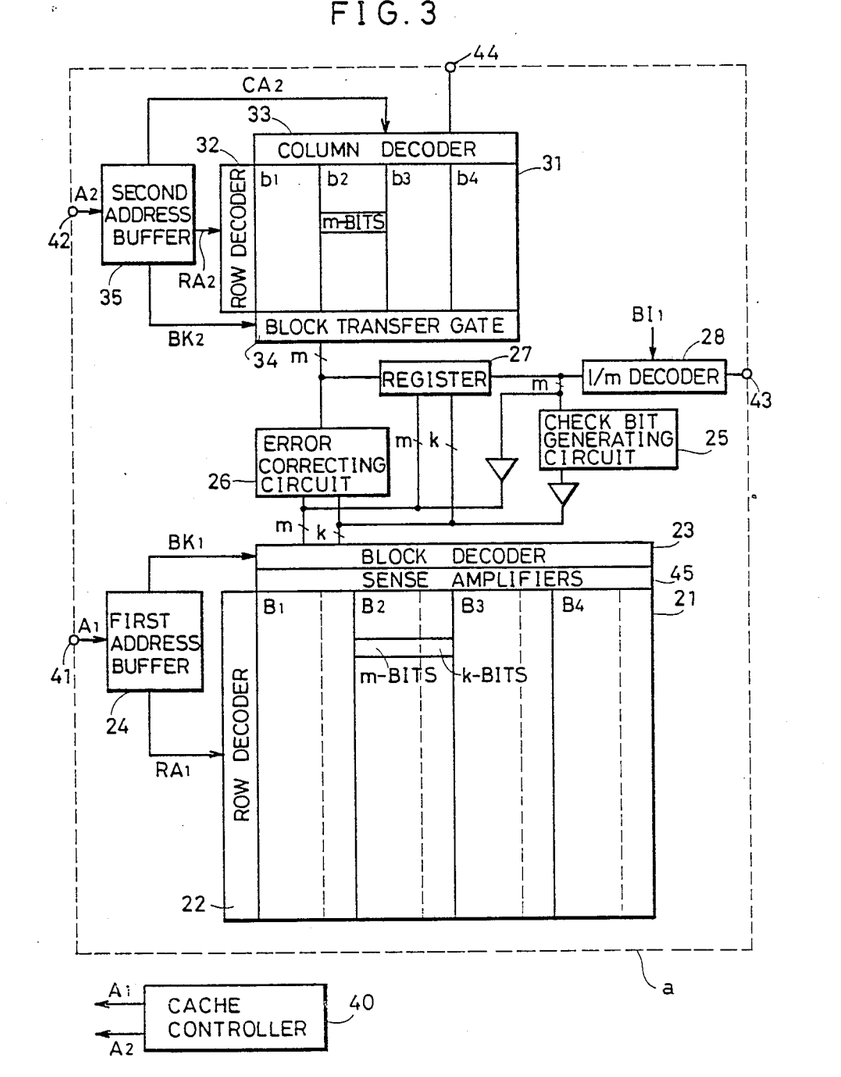
FIG. 3 is a block diagram showing structure of a semiconductor memory device having an error correcting circuit contained therein according to an embodiment of the present invention.

Referring to FIG. 3, description is made on an embodiment of the present invention.

FIG. 3 is a block diagram showing structure of a semiconductor memory device having an error correcting circuit contained therein according to an embodiment of the present invention.

Referring to FIG. 3, a first memory cell array 21 comprises a plurality of memory cells arranged in a plurality of rows and columns. The first memory cell array 21 is divided into a plurality of blocks, each of the blocks comprising memory cells arranged in a plurality of columns. The first memory cell array 21 shown in FIG. 3 is divided into four blocks B1 to B4, each of the blocks B1 to B4 comprising memory cells arranged in (m+k) columns. (m+k)-bit data comprising information bits including m bits and check bits including k bits is stored as one word data in each of the rows in each of the blocks of the first memory cell array 21. The first memory cell array 21 comprises, for example, dynamic random access memory (dynamic RAM) cells.

The first memory cell array 21 is provided with a row decoder 22 responsive to a row address signal RA1 for selecting one row in the first memory cell array 21, a block decoder 23 responsive to a block selecting signal BK1 for selecting one block in the first memory cell array 21 and sense amplifiers 45 for detecting and amplifying data stored in the selected memory cell. A first address buffer 24 applies to the row decoder 22 a part of a first address signal A1 applied to a first address input terminal 41 as the row address signal RA1, another part thereof to the block decoder 23 as the block selecting signal BK1, and the remainder to a 1/m decoder 28 as described below as a bit selecting signal BI1.

On the other hand, a second memory cell array 31 comprises a plurality of memory cells arranged in a plurality of rows and columns. The second memory cell array 31 has smaller capacity than that of the first memory cell array 21 and to which access can be made at higher speed than the access speed to the first memory cell array 21. The second memory cell array 31 comprises, for example, static random access memory (static RAM) cells. The second memory cell array 31 is divided into a plurality of blocks, each of the blocks comprising memory cells arranged in a plurality of columns. The second memory cell array 31 shown in FIG. 3 is divided into four blocks b1 to b4, each of the blocks b1 to b4 comprising memory cells arranged in m columns. An information bit of data which is frequently accessed, of a plurality of data stored in the first memory cell array 21 is stored in each of the rows in each of the blocks of the second memory cell array 31.

The second memory cell array 31 is provided with a row decoder 32 responsive to a row address signal RA2 for selecting one row in the memory cell array 31 and a column decoder 33 responsive to a column address signal CA2 for selecting one column in the second memory cell array 31. In addition, the second memory cell array 31 is provided with a block transfer gate 34 responsive to a block selecting signal BK2 for transferring data on a block basis.

A second address buffer 35 applies to the row decoder 32 a part of a second address signal A2 applied to a second address input terminal 42 as the row address signal RA2, another part thereof to the column decoder 33 as the column address signal CA2, and a part of the column address signal CA2 to the block transfer gate 34 as the block selecting signal BK2.

A check bit generating circuit 25, an error correcting circuit 26 and a register 27 are connected between the first memory cell array 21 and the second memory cell array 31. The check bit generating circuit 25 generates check bits including k bits for detecting and correcting an error in both information bits including m bits and the check bits or an error in information bits. The error correcting circuit 26 is responsive to the check bits for detecting the presence or absence of an error in both the information bits and the check bits or an error in the information bits and correcting the error if the error is detected. One word data is temporarily stored in the register 27. The 1/m decoder 28 is responsive to the bit selecting signal BI1 applied from the first address buffer 24 for selecting one bit of information bits including m bits and providing the same to a first data input/output terminal 43 or one bit data applied to the first data input/output terminal 43 to any one bit in the register 27. In the semiconductor memory device, the above described circuits are formed on one chip a.

The first address signal A1 and the second address signal A2 are applied to the first address input terminal 41 and the second address input terminal 42, respectively, by, for example, a cache controller 40. Meanwhile, a semiconductor memory device comprising a first memory cell array as well as a second memory cell array to which access can be made at high speed is disclosed in U.S. Pat. No. 4,577,293.

Figure 4:
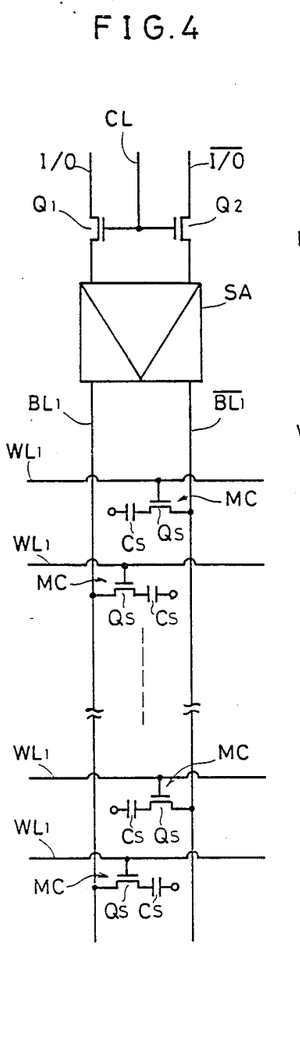
FIG. 4 is a diagram showing an example of circuit structure of one column in the first memory cell array shown in FIG. 3.

FIG. 4 is a diagram showing an example of circuit structure of one column in the first memory cell array 21 shown in FIG. 3.

In FIG. 4, a plurality of word lines WL are arranged intersecting with a bit line pair BL1 and $\overline{BL1}$. Memory cells MC are provided at intersections of the bit line pair BL1 and $\overline{BL1}$ and the word lines WL, respectively. Each of the memory cells MC comprises an MOS transistor Qs and a storage capacitance Cs which stores information. The storage capacitance Cs is connected to the bit line BL1 or $\overline{BL1}$ through the transistor Qs. The transistor Qs has its gate connected to a corresponding word line WL. The word lines WL are connected to the row decoder 22 shown in FIG. 3. When a potential on any of the word lines WL is made to be a high level by the row decoder 22, information stored in the memory cell MC connected to the word line WL is read out to the bit line BL1 or BL1 or information on the bit line BL1 or $\overline{BL1}$ is written to the memory cell MC. Information on the bit lines BL1 and $\overline{BL1}$ are amplified by a sense amplifier SA. In addition, the bit line pair BL1 and $\overline{BL1}$ is connected to a pair of input/output lines I/O and $\overline{I/O}$ through MOS transistors Q1 and Q2. The transistors Q1 and Q2 have their gates connected to the block decoder 23 shown in FIG. 3 through a column selecting line CL. When a potential on the column selecting line CL is raised to a high level by the block decoder 23, the transistors Q1 and Q2 are turned on, so that the bit line pair BL1 and $\overline{BL1}$ is electrically connected to the pair of input/output lines I/O and $\overline{I/O}$.

The dynamic type memory cell shown in FIG. 4 is suitable for increasing density and decreasing the power consumption. However, information stored in the storage capacitance Cs disappears with the lapse of time. Thus, refresh operation must be performed before information disappears.

Figure 5:
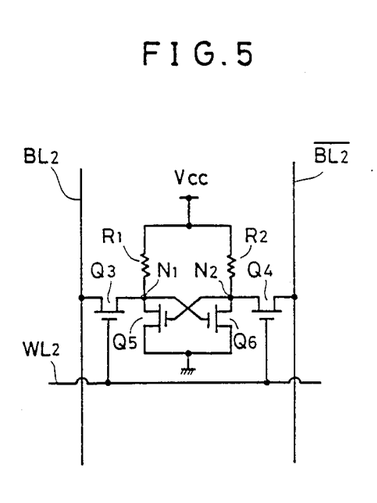
FIG. 5 is a diagram showing an example of a memory cell included in the second memory cell array shown in FIG. 3.

FIG. 5 is a diagram showing an example of a memory cell included in the second memory cell array 31 shown in FIG. 3.

In FIG. 5, the memory cell comprises four MOS transistors Q3 to Q6 and two load resistances R1 and R2. In this memory cell, the transistors Q5 and Q6 constitute a flip-flop, so that information stored in nodes N1 and N2 remain in the stable state until information are rewritten. When a potential on a word line WL2 attains a high level, the transistors Q3 and Q4 are turned on, so that information is transferred between bit lines BL2 and $\overline{BL2}$ and the nodes N1 and N2.

The static type memory cell shown in FIG. 5 has the advantage that it can drive at high speed, does not require refresh operation and has soft error immunity. However, it is inferior to the dynamic type memory cell in terms of the increase in density and the decrease in power consumption.

Description is now made on operation of the semiconductor memory device having an error correcting circuit contained therein as shown in FIG. 3.

Data which is frequently accessed is transferred from the first memory cell array 21 to the second memory cell array 31 and stored therein. According to the present embodiment, the second memory cell array 31 serves as a cache memory.

If and when it is desired to make access to a single memory cell in the first memory cell array 21, the cache controller 40 makes access to a memory cell in the second memory cell array 31 when data stored in the memory cell is also stored in the second memory cell array 31 (referred to as a cache hit), and makes access to a memory cell in the first memory cell array 21 when data stored in the memory cell is not stored in the second memory cell array 31 (referred to as a cache miss).

When a cache hit occurs in read operation, the cache controller 40 makes access to the second memory cell array 31. In this case, the row decoder 32 and the column decoder 33 are responsive to the row address signal RA2 and the column address signal CA2, respectively, for selecting a memory cell in the memory cell array 31. One bit information is provided to a second data input/output terminal 44 from the selected memory cell. The access time in this case equals the access time $t_{A2}$ to the second memory cell array 31.

When a cache miss occurs in read operation, the cache controller 40 makes access to the first memory cell array 21. In this case, the row decoder 22 and the block decoder 23 are responsive to the row address signal RA1 and the block selecting signal BK1, respectively, for selecting one row in one block of the first memory cell array 21 and transferring one word data stored in the row to the error correcting circuit 26. The error correcting circuit 26 is responsive to check bits including k bits included in the one word data for detecting the presence or absence of an error in both information bits including m bits and the check bits or an error in information bits. If an error is detected, the error correcting circuit 26 corrects the error and transfers the same to the 1/m decoder 28 and at the same time, transfers the information bits including m bits of the one word data to the second memory cell array 31. The 1/m decoder 28 is responsive to the bit selecting signal BI1 for selecting one bit of the information bits including m bits and providing the same to the first data input/output terminal 43. The information bits including m bits transferred from the error correcting circuit 26 to the second memory cell array 31 is stored in one row in a block selected by the row decoder 32 and the block transfer gate 34. The access time in this case is the sum of the access time $t_{A1}$ to the first memory cell array 21 and the time $t_{ECC}$ which is required for correcting an error.

When a cache hit occurs in write operation, the row decoder 32 and the column decoder 33 select a memory cell in the second memory cell array 31. One bit data stored in the selected memory cell is reloaded by data applied to a second input/output terminal 44. At the same time, one bit data is applied to the 1/m decoder 28 through the first data input/output terminal 43. One word data selected by the row decoder 22 and the block decoder 23 in the first memory cell array 21 is read out to the register 27. The 1/m decoder 28 is responsive to the bit selecting signal BI1 for reloading by new data one bit of the information bits of data stored in the register 27, and transferring information bits including m bits to the check bit generating circuit 25 and the first memory cell array 21. The check bit generating circuit 25 is responsive to the information bits including m bits for generating new check bits including k bits and writing the same to the same row in the same block as that including the corresponding information bits in the first memory cell array 21.

A cache miss situation in write operation is the same as a cache hit situation except that new information bits are written to only the first memory cell array 21. The active time period for write operation is $t_{A1}+t_{ECC}$ irrespective of the cache hit and the cache miss.

For example, it is assumed that the first memory cell array 21 comprises a dynamic RAM having the access time $t_{A1}$ of 100 nsec and the cycle time $t_{C1}$ of 200 nsec, the second memory cell array 31 comprises a static RAM having the access time $t_{A2}$ and the cycle time $t_{C2}$ of 30 nsec, and the time $t_{ECC}$ required for correcting errors is 20 nsec, where the cycle time $t_{C1}$ is the sum of the access time $t_{A1}$ and the precharging time $t_P$.

If capacity of the dynamic RAM and capacity of the static RAM are suitably selected, the cache hit rate of 90% or more can be obtained depending on the system structure and the program.

Furthermore, the ratio of read operation to write operation is generally about 3:1. Assuming that the cache hit rate is 90%, the average cycle time $<t_C>$ is represented by the following equation:

$$
\begin{aligned}
<t_C> &= 0.9 \times 2/3 \times t_{C2} + (0.1 + 0.9 \times 1/3) \times (t_{C1} + T_{ECC}) \\
&= 0.6 \times 30 + 0.4 \times 220 \\
&= 18 + 88 = 106 \, [nsec]
\end{aligned}
$$

Thus, the average cycle time $<t_C>$ of the semiconductor memory device is shorter, by 47%, than the cycle time 200 nsec of the dynamic RAM.

Figure 6:
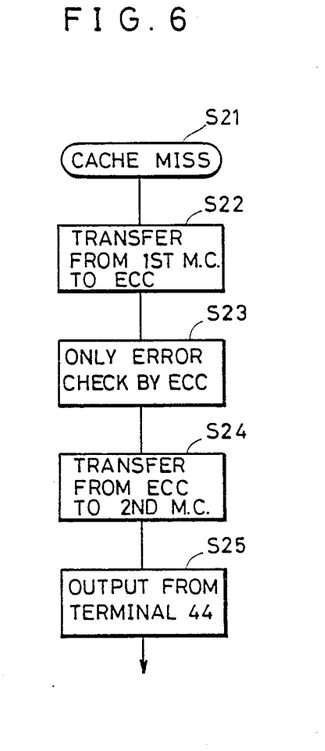
FIG. 6 is a flow chart for explaining an example of a read operation in the case of a cache miss.

Although in the above described embodiment, in the case of a cache miss in read operation, information is outputted from the first data input/output terminal 43 and at the same time, transferred to the second memory cell array 31, the information may be transferred to the second memory cell array 31 and then, outputted from the second data input/output terminal 44. The operation in this case is shown in a flow chart of FIG. 6. When a cache miss occurs in read operation (in the step S21), access is made to the first memory cell array 21. One word data selected in the first memory cell array 21 is transferred to the error correcting circuit 26 (in the step S22). The error correcting circuit 26 detects the presence or absence of an error in both information bits including m bits and check bits including k bits or an error in information bits in response to the check bits of the one word data (in the step S23). The information bits including m bits are transferred to the second memory cell array 31 (in the step S24), and outputted from the second data input/output terminal 44 (in the step S25). In this case, if an error is only detected but is not corrected by the error correcting circuit 26 at the time of transferring information, shorter access time can be obtained.

Figure 7:
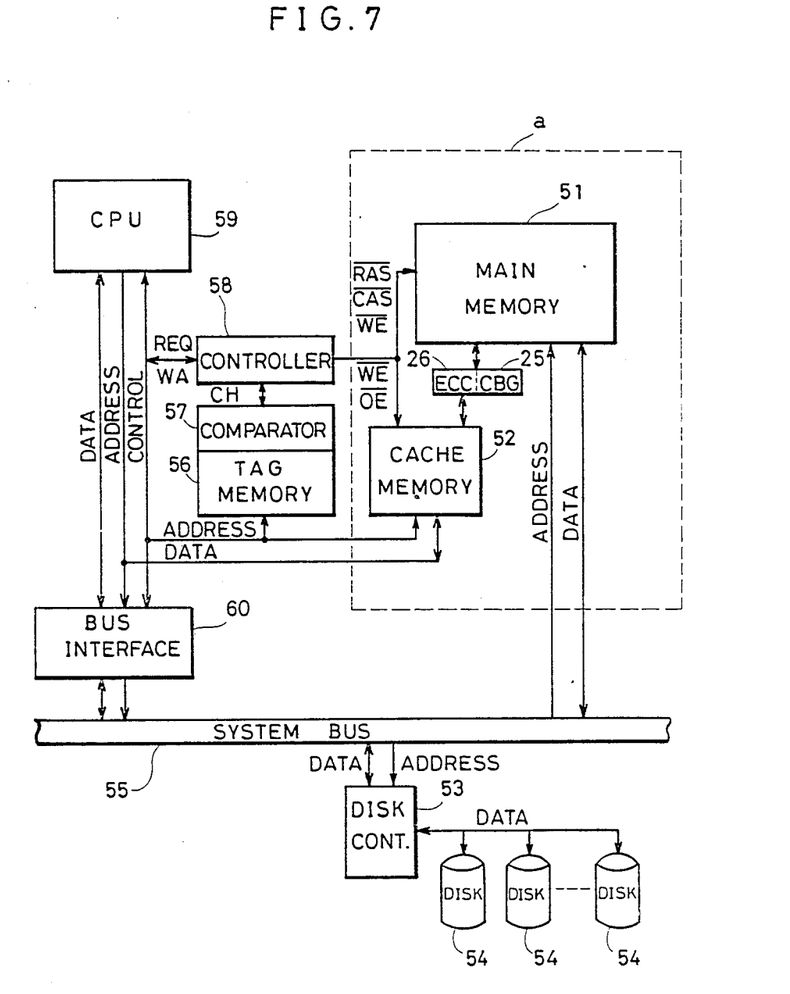
FIG. 7 is a block diagram showing structure of a cache memory system employing the semiconductor memory device according to the above described embodiment.
Figure 8:
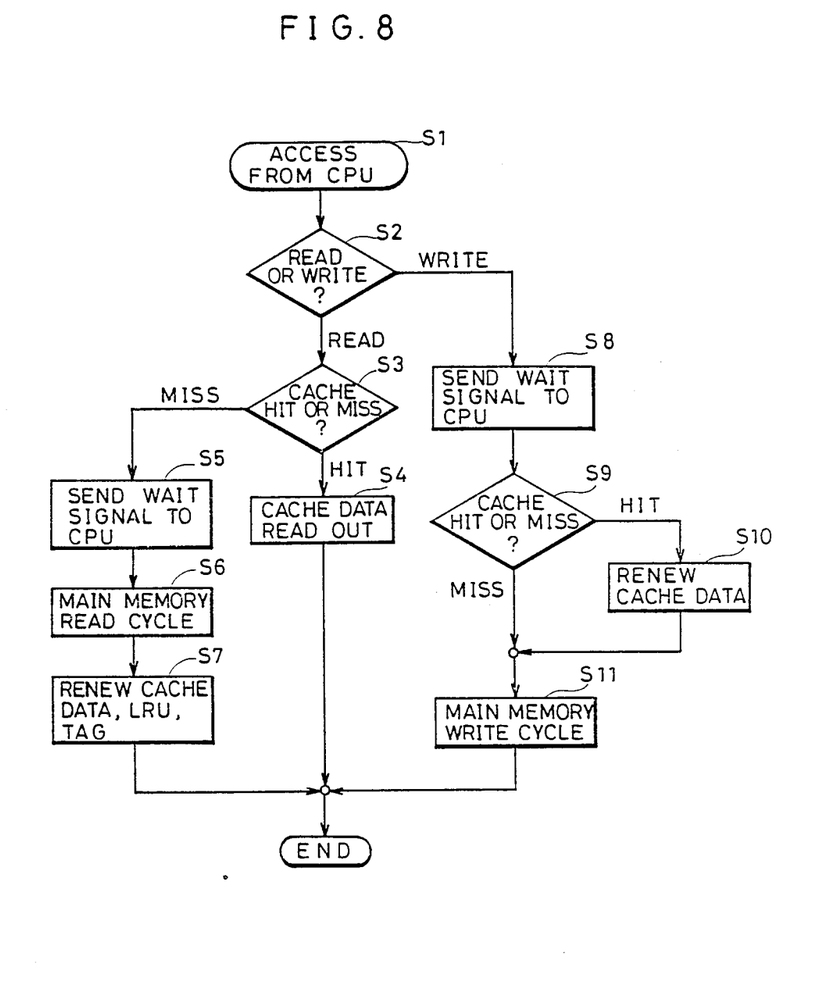
FIG. 8 is a flow chart for explaining an operation of the cache memory system shown in FIG. 7.
Figure 9:
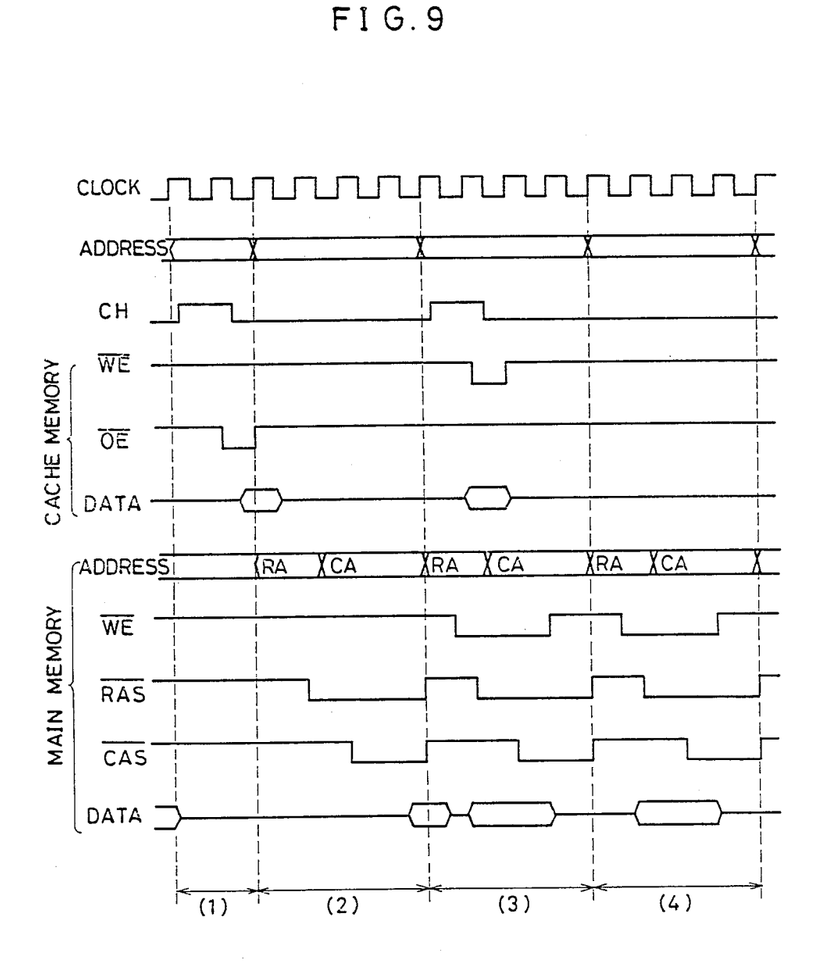
FIG. 9 is a timing chart for explaining the operation of the cache memory system shown in FIG. 8.

FIG. 7 is a block diagram showing structure of a cache memory system employing the semiconductor memory device according to the above described embodiment. FIGS. 8 and 9 are a flow chart and a timing chart for explaining operation of the cache memory system shown in FIG. 7, respectively.

In FIG. 7, a main memory 51 mainly comprises the first memory cell array 21 shown in FIG. 3, and a cache memory 52 mainly comprises the second memory cell array 31. Detailed connection of an error correcting circuit (ECC) 26 and a check bit generating circuit (CBG) 25 and the like is omitted but is the same as that shown in FIG. 3. Data stored in disks 54 are transferred to a main memory 51 through a system bus 55 by a disk controller 53. A part of data stored in the main memory 51 is transferred also to the cache memory 52. A TAG memory 56 stores an address of data stored in the cache memory 52. A controller 58 determines whether data is to be read or written when it receives an access request signal REQ from a CPU (Central Processing Unit) 59 (in the steps S1 and S2 shown in FIG. 8). At the time of reading out data, the comparator 57 compares an address applied from the CPU 59 and the address stored in the TAG memory 56 and applies a cache hit signal CH indicating the compared result to the controller 58. The controller 58 determines a cache hit or cache miss by the cache hit signal CH (in the step S3). In the case of the cache hit, the controller 58 makes access to the cache memory 52. Consequently, data is read out from the cache memory 52 (in the step S4). The operation in this case is shown in FIG. 9(1). More specifically, the cache hit signal CH applied from the comparator 57 to the controller 58 attains an "H" level. An output enable signal $\overline{OE}$ applied from the controller 58 to the cache memory 52 attains an "L" level. Consequently, data is read out from a memory cell in the cache memory 52 designated by the address signal from the CPU 59 and applied to the CPU 59.

When a cache miss occurs in the step S3 shown in FIG. 8, the controller 58 applies a wait signal WA to the CPU 59 and makes access to the main memory 51 (in the step S5). Consequently, data is read out from the main memory 51 (in the step S6). The operation in this case is shown in FIG. 9(2). More specifically, the cache hit signal CH applied from the comparator 57 to the controller 58 attains the "L" level. The write enable signal $\overline{WE}$ applied from the controller 58 to the main memory 51 is at the "H" level. First, an address signal applied from the CPU 59 to the system bus 55 is accepted in the main memory 51 as a row address signal RA in response to the fall of a row address strobe signal $\overline{RAS}$ applied to the main memory 51. Thereafter, the address signal applied from the CPU 59 to the system bus 55 is accepted in the main memory 51 as a column address signal CA in response to the fall of a column address strobe signal $\overline{CAS}$ applied from the controller 58 to the main memory 51. Data is read to the system bus 55 from a memory cell in the main memory 51 designated by the row address signal RA and the column address signal CA and applied to the CPU 59 through a bus interface 60. At the same time, data stored in the accessed memory cell in the main memory 51 is transferred to the cache memory 52 through the error correcting circuit 26. This data is replaced with Least Recently Used data, of data stored in the cache memory 52. The content of the TAG memory 56 is updated (in the step S7 shown in FIG. 8).

On the other hand, when data is written in the step S2 shown in FIG. 8, the controller 58 applies the wait signal WA to the CPU 59 (in the step S8). The comparator 67 compares the address applied from the CPU 59 and the address stored in the TAG memory 56 and applies the cache hit signal CH corresponding to the compared result to the controller 58. The controller 58 determines a cache hit or a cache miss by the cache hit signal CH (in the step S9). In the case of the cache hit, the controller 58 makes access to the cache memory 52. Consequently, data is written to the cache memory 52 (in the step S10). At the same time, the controller 58 makes access to the main memory 52. Consequently, data is written to the main memory 52 (in the step S11). The operation in this case is shown in FIG. 9(3). More specifically, the cache hit signal CH applied from the comparator 57 to the controller 58 attains the "H" level. The write enable signal WE applied from the controller 58 to the cache memory 52 attains the "L" level. Consequently, data from the CPU 59 is written to the memory cell in the cache memory 52 designated by the address signal from the CPU 59. Access is made to the main memory 51 simultaneously with this operation. First, the write enable signal $\overline{WE}$ falls to the "L" level. The address signal applied to the system bus 55 is acquired in the main memory 51 as the row address signal RA in response to the fall of the row address strobe signal $\overline{RAS}$. The address signal applied to the system bus 55 is acquired in the main memory 51 as the column address signal CA in response to the fall of the column address strobe signal $\overline{CAS}$. Data is written from the system bus 55 to a memory cell in the main memory 51 designated by the row address signal RA and the column address signal CA.

When a cache miss occurs in the step S9 shown in FIG. 8, the controller 58 makes acess to the main memory 51. Consequently, data is written to a corresponding memory cell in the main memory 51 (in the step S11). The operation in this case is shown in FIG. 9(4). More specifically, the cache hit signal CH applied from the comparator 57 to the controller 58 remains at the "L" level. Thus, access is not made to the cache memory 52. In the same manner as the case (3), data is written from the systems bus 55 to a memory cell in the main memory 51.

Meanwhile, operation of the error correcting circuit 26 and the check bit generating circuit 25 in this cache memory system is the same that described referring to FIG. 3.

Figure 10:
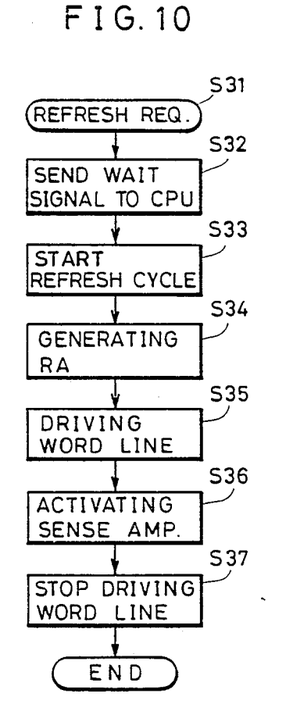
FIG. 10 is a flow chart showing an example of a refresh operation in the cache memory system shown in FIG. 7.

When the first memory cell array 21 comprises the dynamic type memory cell shown in FIG. 4, refresh operation must be performed before information stored in the memory cell disappears with the lapse of time. FIG. 10 is a flow chart showing an example of the refresh operation in the cache memory system shown in FIG. 7. The controller 58 receives the refresh request signal, and applies a wait signal WA to the CPU 59 (in the steps S31 and S32). Consequently, a refresh cycle is started (in the step S33). When a refresh address counter is contained in the main memory 51, the row address signal RA is generated by the refresh address counter (in the step S34). A single word line WL1 (in FIG. 4) in the first memory cell array 21 (in FIG. 3) is selected by the row decoder 22 in response to the row address signal RA, so that a potential on the word line WL1 is raised (in the step S35). Consequently, information stored in the memory cell MC connected to the selected word line WL1 is read out to the bit lines BL1 and $\overline{BL1}$. The read information is amplified by the sense amplifier SA (in the step S36). Thereafter, the potential on the word line WL1 is lowered, so that the amplified information is rewritten in each of the memory cells MC (in the step S37).

Additionally, if errors are corrected by the error correcting circuit 26 (in FIG. 3) at the time of refreshing by the sense amplifiers 45, higher reliability can be obtained.

Figure 11:
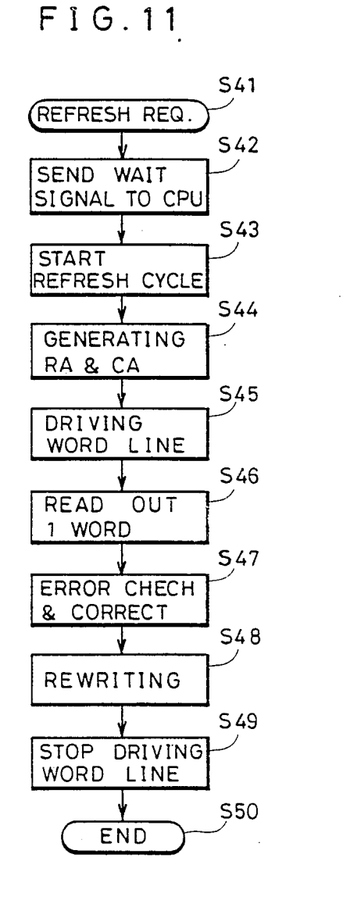
FIG. 11 is a flow chart showing another example of the refresh operation in the cache memory system shown in FIG. 7.

The operation in this case is shown in a flow chart of FIG. 11. The controller 58 (in FIG. 7) receives the refresh request signal, and applies the wait signal WA to the CPU 59 (in the steps S41 and S42). Consequently, a refresh cycle is started (in the step S43). If the refresh address counter is contained in the main memory 51, the row address signal RA and the column address signal CA are generated by the refresh address counter (in the step S44). The row decoder 22 raises a potential on a single word line WL1 in response to the row address signal RA (in the step S45). Consequently, information stored in the memory cell MC is read out to the bit line BL1 or $\overline{BL1}$. The read information is amplified by the sense amplifier SA. The block decoder 23 reads out one word information, of information on a plurality of bit line pairs BL1 and $\overline{BL1}$ in response to the column address signal CA (in the step S46), and transfers the same to the error correcting circuit 26. The error correcting circuit 26 detects an error of the one word information. When an error is detected, the error correcting circuit 26 corrects the error (in the step S47). The one word information is returned to the first memory cell array 21 again, and rewritten in the original memory cells MC (in the step S48). The potential on the word line WL1 is lowered (in the step S49), so that the refresh operation is completed (in the step S50).

Thus, if errors are corrected by the error correcting circuit 26 at the time of refreshing by the sense amplifier SA, higher reliability can be obtained.

As described in the foregoing, according to the present invention, since information comprised of a plurality of bits which is frequently accessed can be transferred from first storing means to second storing means to which access can be made at high speed and errors are corrected at the time of transferring information, a reliable and high-speed semiconductor memory device is obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device for storing information bits including a plurality of bits and check bits for detecting and correcting an error in both the information bits and the check bits or an error in the information bits, comprising, on a single chip;
   check bit generating means responsive to said information bits for generating said check bits,
   first storing means for storing a plurality of sets of said information bits and said check bits generated by said check bit generating means,
   error correcting means for detecting and correcting the error in both said information bits and said check bits or the error in said information bits using said check bits corresponding to said information bits,
   first transferring means for transferring to said error correcting means said information bits and said check bits corresponding thereto, stored in said first storing means,
   second storing means to which access can be made faster than the access speed to said first storing means and for storing some of said information bits, said second storing means comprising a cache memory means for accessing data stored therein during a reading operation whenever data stored therein corresponds to an externally applied address signal, the capacity of said second storing means being less than the capacity of said first storing means, and
   second transferring means for transferring to said second storing means said information bits already corrected for any error by said error correcting means.

2. A semiconductor memory device according to claim 1, wherein
   said first storing means further comprises refreshing means for refreshing each of said memory cells, and
   said error correcting means detects and corrects the error in both the information bits and check bits or the error in the information bits at the time of refreshing each of the memory cells by said refreshing means.

3. A semiconductor memory device according to claim 1, wherein
   said first storing means comprises a plurality of memory cells arranged in a plurality of rows and columns and is divided into a plurality of blocks, each of said blocks comprising memory cells arranged in a plurality of columns, each of said information bits and each of said check bits corresponding thereto being stored in any row in any of said blocks,
   said second storing means comprises a plurality of memory cells arranged in a plurality of rows and columns and is divided into a plurality of blocks, each of said blocks comprising memory cells arranged in a plurality of columns, each of said information bits being stored in any row in any of said blocks,
   the number of the memory cells in said second storing means is smaller than the number of memory cells which store said information bits, of the memory cells in said first storing means,
   said first transferring means comprises first row selecting means for selecting one row in said first storing means and first block selecting means for selecting one block of said first storing means, and
   said second transferring means comprises second row selecting means for selecting one row in said second storing means and second block selecting means for selecting one block of said second storing means.

4. A semiconductor memory device according to claim 3, wherein
   the memory cell included in said first storing means each comprise a dynamic memory cell and
   the memory cells included in said second storing means each comprise a static memory cell.

5. A semiconductor memory device according to claim 1, which further comprises
   bit selecting means for selecting the bit to which access is required from among said information bits, and
   column selecting means for selecting the column to which access is required in said second storing means.

6. A semiconductor memory device according to claim 5, wherein
   the memory cells included in said first storing means each comprise a dynamic memory cell, and
   the memory cells included in said second storing means each comprise a static memory cell.

7. A semiconductor memory device according to claim 3, which further comprises bit selecting means for selecting the bit to which access is required from among said information bits, and column selecting means for selecting the column to which access is required in said second storing means.

8. A semiconductor memory device according to claim 7, which further comprises a first input/output terminal for inputting or outputting one bit information to or from said bit selecting means, and a second input/output terminal for inputting or outputting information to or from a memory cell in said second storing means selecting by said second row selecting means and said column selecting means.

9. A semiconductor memory device according to claim 5, which further comprises a first input/output terminal for inputting or outputting one bit information to or from said bit selecting means, and a second input/output terminal for inputting or outputting information to or from a memory cell in said second storing means selected by said second row selecting means and said column selecting means.

10. A semiconductor memory device according to claim 9, wherein the memory cells included in said first storing means each comprise a dynamic memory cell, and the memory cells included in said second storing means each comprise a static memory cell.

11. A semiconductor memory device for storing information bits including a plurality of bits and checks for detecting and correcting an error in both the information bits and the check bits or an error in the information bits, comprising, on a single chip:

check bit generating means responsive to said information bits for generating said check bits, first storing means for storing a plurality of sets of said information bits and said check bits generated by said check bit generating means, error correcting means for detecting and correcting the error in both said information bits and said check bits or the error in said information bits using said check bits corresponding to said information bits, first transferring means for transferring to said error correcting means said information bits and said check bits corresponding thereto, stored in said first storing means, second storing means to which access can be made faster than the across speed to said first storing means and for storing some of said information bits, said second storing means comprising a cache memory means for accessing data stored therein during a reading operation whenever data stored therein corresponds to an externally applied address signal, the capacity of said second storing means being less than the capacity of said first storing means, and second transferring means for transferring to said second storing means said information bits, wherein said error correcting means detects but does not correct an error when said information bits and said check bits stored in said first storing means are transferred to said error correcting means by said first transferring means and the informatin bits are further transferred, uncorrected, to said second storing means by said second transferring means.

12. A method for controlling a semiconductor memory device for storing information bits including, on a single chip, a plurality of bits and check bits used for detecting and correcting an error in both the information bits and the check bits or an error in the information bits, comprising check bit generating means responsive to said information bits for generating said check bits; first storing means for storing a plurality of sets of said information bits and said check bits generated by said check bit generating means; error correcting means for detecting and correcting the error in both said information bits and said check bits or the error in said information bits using said check bits corresponding to said information bits; and second storing means comprising a cache memory having smaller memory capacity than said first storing means, and to which access can be made faster than the access speed to said first storing means, and for storing some of said information bits, comprising:

a first read operation, a second read operation, a first write operation and a second write operation, wherein said first read operation comprises reading out the information bits stored in said second storing means, said second read operation comprises reading out the information bits stored in said first storing means, transferring said information bits and said check bits corresponding thereto to said error correcting means, and correcting any error in the information bits and writting the resulting information bits to said second storing means, said first write operation comprises writing information bits to said second storing means and writing said information bits and said check bits generated by said check bit generating means to said first storing means, and said second write operating comprises writing information bits and said check bits generated by said check bit generating means to said first storing means.

* * * * *